United States Patent
Kim et al.

(10) Patent No.: US 11,212,866 B2
(45) Date of Patent: Dec. 28, 2021

(54) METHOD AND APPARATUS FOR PROVIDING CELLULAR IOT SERVICE IN MOBILE COMMUNICATION SYSTEM

(71) Applicant: Samsung Electronics Co., Ltd., Gyeonggi-do (KR)

(72) Inventors: Sunghoon Kim, Gyeonggi-do (KR); Youngkyo Baek, Gyeonggi-do (KR); Jungje Son, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/860,624

(22) Filed: Apr. 28, 2020

(65) Prior Publication Data

US 2020/0260521 A1 Aug. 13, 2020

Related U.S. Application Data

(63) Continuation of application No. 16/371,470, filed on Apr. 1, 2019, now Pat. No. 10,645,749.

(30) Foreign Application Priority Data

Mar. 30, 2018 (KR) .................. 10-2018-0037769
Jun. 25, 2018 (KR) .................. 10-2018-0072996

(51) Int. Cl.
*H04W 76/00* (2018.01)
*H04W 76/27* (2018.01)
(Continued)

(52) U.S. Cl.
CPC ............. *H04W 76/27* (2018.02); *H04W 4/70* (2018.02); *H04W 76/38* (2018.02)

(58) Field of Classification Search
CPC ........ H04W 76/27; H04W 76/38; H04W 4/70
See application file for complete search history.

(56) References Cited

U.S. PATENT DOCUMENTS

2016/0113057 A1\* 4/2016 Haneji .................. H04W 76/34
370/328
2018/0259803 A1 9/2018 Chang
(Continued)

FOREIGN PATENT DOCUMENTS

WO WO 2017/120278 7/2017
WO WO 2017/131502 8/2017
(Continued)

OTHER PUBLICATIONS

3GPP, 3rd Generation Partnership Project; Technical Specification Group Services and System Aspects; Study on Cellular IoT Support and Evolution for the 5G System (Release 16), 3GPP TR 23.724 V0.2.0, Mar. 2018, 63 pages.
(Continued)

*Primary Examiner* — Khai M Nguyen
(74) *Attorney, Agent, or Firm* — The Farrell Law Firm, P.C.

(57) ABSTRACT

Disclosed is a method performed by a terminal in a wireless communication system, including identifying, by an access stratum (AS) layer of the terminal, release assistance information (RAI), transmitting, to a base station, a control message associated with a radio resource control (RRC) connection, the control message including the RAI identified by the AS layer of the terminal, and transmitting uplink data to the base station, wherein the RAI indicates that no further data transmission is required or a single downlink data (Continued)

transmission subsequent to the uplink data is required, and wherein the uplink data is transmitted to a user plane function (UPF) entity via the base station.

16 Claims, 10 Drawing Sheets

(51) Int. Cl.
*H04W 76/38* (2018.01)
*H04W 4/70* (2018.01)

(56) References Cited

U.S. PATENT DOCUMENTS

| | | |
|---|---|---|
| 2018/0352424 A1 | 12/2018 | Byun |
| 2019/0037441 A1* | 1/2019 | Liu ........................ H04W 28/06 |
| 2019/0045349 A1 | 2/2019 | Kim et al. |
| 2019/0053034 A1 | 2/2019 | Kim |
| 2019/0141515 A1* | 5/2019 | Kim .................. H04W 74/0833 |
| 2019/0200414 A1* | 6/2019 | Abraham .............. H04W 76/27 |
| 2020/0092932 A1* | 3/2020 | Youn ..................... H04W 76/20 |

FOREIGN PATENT DOCUMENTS

| | | | |
|---|---|---|---|
| WO | WO 2017/133470 | 8/2017 | |
| WO | WO 2017/151437 | 9/2017 | |
| WO | WO-2017151437 A1 * | 9/2017 | ............ H04W 76/11 |
| WO | WO 2017/172912 | 10/2017 | |

OTHER PUBLICATIONS

European Search Report dated Oct. 7, 2020 issued in counterpart application No. 19776784.1-1213, 9 pages.
International Search Report dated Jul. 12, 2019 issued in counterpart application No. PCT/KR2019/003784, 10 pages.
3GPP, Digital Cellular Telecommunications System (Phase 2+) (GSM); Universal Mobile Telecommunications System (UMTS); LTE; Architecture Enhancements to Facilitate Communications with Packet Data Networks and Applications (3GPP TS 23.682 Version 13.6.0 Release 13), ETSI TS 123 682 V13.6.0, Jul. 2016, 93 pages.
Korean Office Action dated Aug. 29, 2021 issued in counterpart application No. 10-2018-0072996, 7 pages.

* cited by examiner

FIG. 8

| Outer IP header: Source IP=AMF, Destination IP=UPF | UDP header | GTP Header: For Packet aggregation session | TEID of UE's PDU session | Packet from UE | TEID of UE's PDU session | Packet from UE |

FIG. 9

| Outer IP header: source IP=SMF IP address, Destination IP = UPF IP address | UDP header | Uplink TEID for Packet aggregation GTP-U tunnel | uplink TEID for the UE for the PDU session | Packet from UE | uplink TEID for the UE for the PDU session | Packet from UE |

METHOD AND APPARATUS FOR PROVIDING CELLULAR IOT SERVICE IN MOBILE COMMUNICATION SYSTEM

CROSS-REFERENCE TO RELATED APPLICATION(S)

This application is a Continuation Application of U.S. patent application Ser. No. 16/371,470, filed on Apr. 1, 2019, which is based on and claims priority under 35 U.S.C. § 119 to Korean Patent Application Nos. 10-2018-0037769 and 10-2018-0072996, respectively filed on Mar. 30, 2018 and Jun. 25, 2018, in the Korean Intellectual Property Office, the disclosures of which are incorporated by reference herein in their entirety.

BACKGROUND

1. Field

The disclosure relates to a mobile communication system, and more particularly, to a method and apparatus for providing a cellular Internet of Things (IoT) service in a mobile communication system.

2. Description of Related Art

In order to meet the increasing demand with respect to wireless data traffic since the commercialization of $4^{th}$ generation (4G) communication systems, efforts have been made to develop improved $5^{th}$ generation (5G) communication systems or pre-5G communication systems. For this reason, 5G communication systems or pre-5G communication systems are often referred to as beyond 4G network communication systems or post long term evolution (LTE) systems.

In order to achieve a high data transfer rate, consideration is given to implementing 5G communication systems in millimeter wave (mmW) frequency bands (e.g., 60 GHz bands). In order to reduce propagation path loss and increase a propagation distance in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, developments of technologies such as evolved small cell, advanced small cell, cloud radio access network (RAN), ultra-dense network, device to device communication (D2D), wireless backhaul, moving network, cooperative communication, coordinated multi-points (CoMP), and interference cancellation are underway. Further, in 5G communication systems, developments of an advanced coding modulation (ACM) scheme, such as hybrid frequency-shift keying (FSK) and quadrature amplitude modulation (QAM) (FQAM) and sliding window superposition coding (SWSC), and an enhanced network access scheme, such as filter bank multi carrier (FBMC), non-orthogonal multiple access (NOMA), and sparse code multiple access (SCMA), are underway.

The Internet is evolving from a human-centered connection network through which humans create and consume information to an IoT network, wherein distributed elements, i.e., things, exchange and process information. Internet of Everything (IoE) technology, which is a combination of IoT technology and big data processing technology through a connection with a cloud server, is also emerging.

In order to implement IoT, technology elements such as sensing technology, wired/wireless communication and network infrastructure, service interface technology, and security technology are required, and thus, technology for inter-object connection, such as a sensor network, machine to machine (M2M) communication, or machine type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology and various industries.

Various attempts are being made to apply 5G communication systems to IoT networks. For example, technology such as a sensor network, M2M communication, or MTC is implemented by 5G communication technology such as beam-forming, MIMO, or array antenna. The application of a cloud RAN as big data processing technology may also be considered as an example of convergence of $3^{rd}$ generation (3G) technology and IoT technology.

Because mobile communication systems may provide various services due to the development of the above mobile communication systems, methods of smoothly providing the services are required.

SUMMARY

The disclosure is provided to address at least the problems and/or disadvantages described above and to provide at least the advantages described below.

An aspect of the disclosure is to provide apparatuses and methods capable of effectively providing services in mobile communication systems.

According to an aspect of the disclosure, a method performed by a terminal in a wireless communication system includes identifying, by an access stratum (AS) layer of the terminal, release assistance information (RAI), transmitting, to a base station, a control message associated with a radio resource control (RRC) connection, the control message including the RAI identified by the AS layer of the terminal, and transmitting uplink data to the base station, wherein the RAI indicates that no further data transmission is required or a single downlink data transmission subsequent to the uplink data is required, and wherein the uplink data is transmitted to a user plane function (UPF) entity via the base station.

According to another aspect of the disclosure, a method performed by a base station in a wireless communication system includes receiving, from a terminal, a control message associated with an RRC connection, the control message including RAI identified by an AS layer of the terminal, receiving uplink data from the terminal, and transmitting the uplink data to a UPF entity, wherein the RAI indicates that no further data transmission is required or a single downlink data transmission subsequent to the uplink data is required.

According to another aspect of the disclosure, a terminal in a wireless communication system includes a transceiver, and at least one controller configured to identify, by an AS layer of the terminal, RAI, transmit, to a base station via the transceiver, a control message associated with an RRC connection, the control message including the RAI identified by the AS layer of the terminal, and transmit uplink data to the base station via the transceiver, wherein the RAI indicates that no further data transmission is required or a single downlink data transmission subsequent to the uplink data is required, and wherein the uplink data is transmitted to a user plane function (UPF) entity via the base station.

According to another aspect of the disclosure, a base station in a wireless communication system includes a transceiver, and at least one controller configured to receive, from a terminal via the transceiver, a control message associated with an RRC connection, the control message including RAI identified by an AS layer of the terminal, receive uplink data from the terminal via the transceiver, and transmit the uplink data to a UPF entity via the transceiver, wherein the RAI indicates that no further data transmission is required or a single downlink data transmission subsequent to the uplink data is required.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 illustrates a structure of a message from an AMF according to an embodiment;

FIG. 9 illustrates a structure of a message from an AMF according to an embodiment.

DETAILED DESCRIPTION

Figure 1:
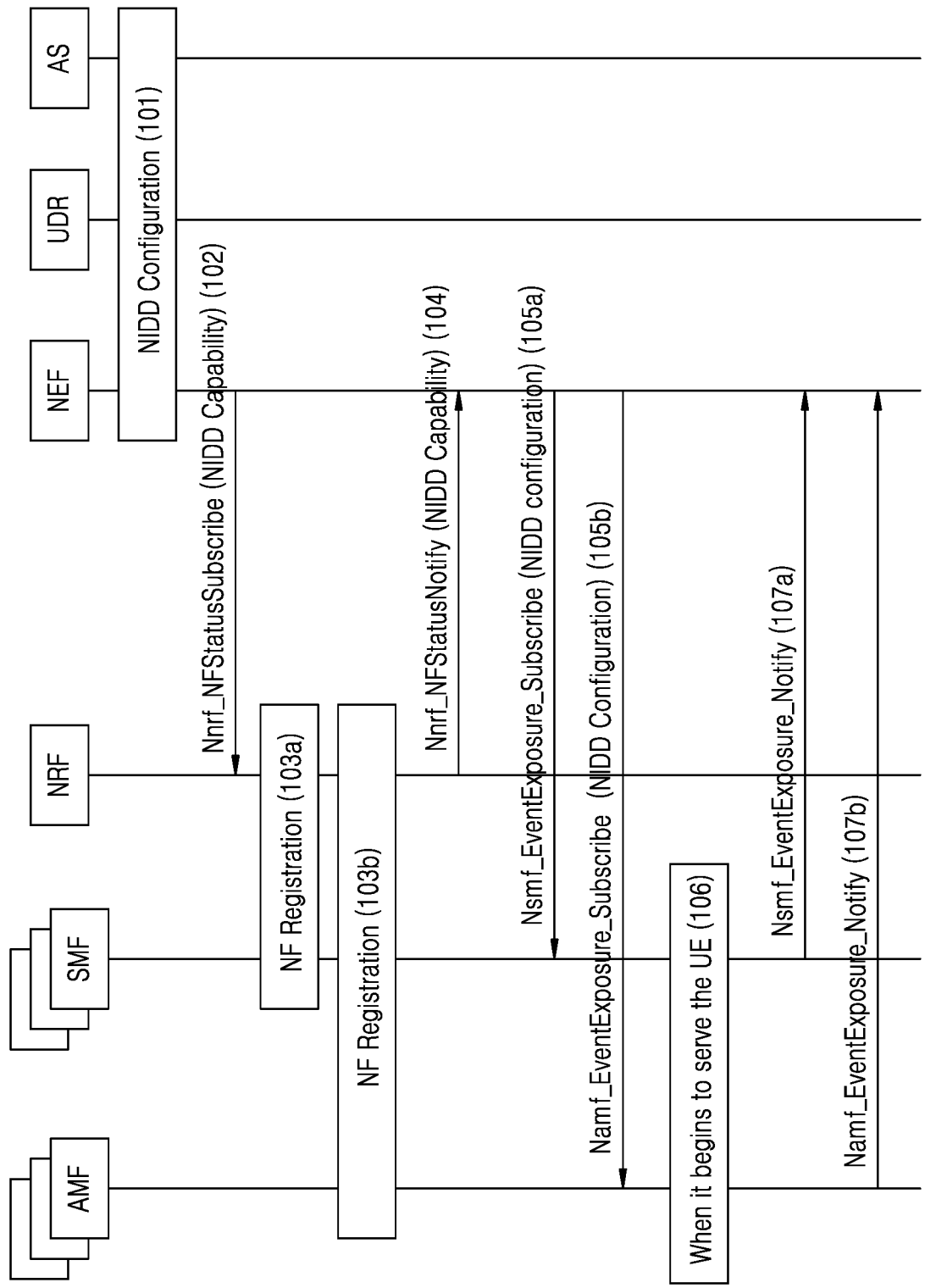
FIG. 1 is a signal flow diagram illustrating a procedure in which an NEF requests data transmission configuration, according to an embodiment.

Hereinafter, various embodiments of the disclosure will be described in detail with reference to the accompanying drawings.

In the following, descriptions of techniques that are well known in the art and/or not directly related to the disclosure are omitted for clarity and conciseness.

In the drawings, some elements are exaggerated, omitted, or schematically illustrated. Also, the size of each element does not entirely reflect the actual size. Further, the same or corresponding elements may be denoted by the same reference numerals.

The advantages and features of the disclosure and the method of achieving the advantages and features will become apparent with reference to embodiments of the disclosure described in detail below with reference to the accompanying drawings. The disclosure may, however, be embodied in many different forms and should not be construed as limited to embodiments of the disclosure set forth herein. Rather, these embodiments of the disclosure are provided so that this disclosure will be thorough and complete, and will fully convey the scope of the disclosure to one of ordinary skill in the art. The disclosure is only defined by the scope of claims.

Each block of the flowchart illustrations and combinations of blocks in the drawings may be implemented by computer program instructions. These computer program instructions may be provided to a processor of a general-purpose computer, special purpose computer, or other programmable data processing apparatus, such that the instructions, which are executed via the processor of the computer or other programmable data processing apparatus, instruct the performance of functions specified in the flowchart block or blocks. These computer program instructions may also be stored in a computer-usable or computer-readable memory that may direct a computer or other programmable data processing apparatus to function in a particular manner, such that the instructions stored in the computer-usable or computer-readable memory produce a manufactured article that performs the functions specified in the flowchart block or blocks. The computer program instructions may also be loaded onto a computer or other programmable data processing apparatus to cause a series of operational steps to be performed on the computer or other programmable apparatus to produce a computer implemented process, such that the instructions that are executed on the computer or other programmable data processing equipment provide steps for implementing the functions specified in the flowchart block or blocks.

In addition, each block may represent a module, segment, or portion of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

Herein, the term "unit" may refer to a software or hardware component such as a field programmable gate array (FPGA) or an application specific integrated circuit (ASIC), which performs certain tasks. However, a unit is not limited to software or hardware, but may be configured to reside on an addressable storage medium and configured to execute on one or more processors. Thus, a unit may include, e.g., components, such as software components, object-oriented software components, class components, and task components, processes, functions, attributes, procedures, sub-routines, segments of program code, drivers, firmware, microcode, circuitry, data, databases, data structures, tables, arrays, and variables. The functionality provided in the components and units may be combined into fewer components and units or further separated into additional components and units. In addition, the components and units may be implemented to operate one or more central processing units (CPUs) in a device or a secure multimedia card. Also, a unit may include one or more processors.

In the following description, terms for identifying a connection node, terms for indicating network entities, terms for indicating messages, terms for indicating an interface between network objects, terms for indicating various kinds of identification information, etc., are provide for convenience of explanation, and the disclosure is not limited by these following terms. Accordingly, other terms having equivalent technical meanings may be used.

The following description will be made mainly based on a wireless connection network in which a 3$^{rd}$ generation partnership project (3GPP) determines a 5G network standard, a new RAN (NR), which is a core network, and a packet core (e.g., a 5G system, a 5G core network, or a next generation (NG) core). However, the subject matter of the disclosure may also be applied to other communication systems having similar technical backgrounds through slight modifications without departing from the scope of the disclosure.

A CIoT service of a 5G system may support transmitting data as a non-access stratum (NAS) message between a terminal and a core network, allowing the core network to transmit the data to an external data network, and transmitting data sent by the terminal to an external server through an NEF.

For convenience of explanation, in the disclosure, terms and names defined in the 3rd generation partnership project (3GPP) LTE standard or modifications thereof are used. However, the disclosure is not limited by these terms and names, and may be identically applied to systems according to other standards.

In the disclosure, an optimization method for an efficient operation between NFs in supporting CIoT services in a 5G mobile communication system is described.

A function in which a terminal sends data to an AS through an NEF is provided as one of the CIoT services in the 5G mobile communication system. The function allows the terminal to transmit non-Internet protocol (IP) data to the AS, and may be referred to as non-IP data delivery (NIDD). Also, a reliable data transmission service, which may be referred to as a reliable data service (RDS), may be provided between the terminal and the NEF.

In order to support the transmission of small data for IoT through the NEF, the NEF and other NFs, e.g., an AMF and an SMF, establish a connection for data transmission or exchange related information. Conventionally, a terminal may perform a registration procedure to establish a connection between the AMF and the NEF, or whether to support a data transmission service through the NEF may be set in a unified data repository (UDR), which is a subscriber information server of the terminal, and may be updated to the AMF or the SMF to establish a connection between the NEF and the AMF or the SMF. However, because the terminal performs a registration procedure, the UDR has to update subscriber information to the AMF or the SMF, and then the AMF or the SMF has to perform a procedure with the NEF according to updated content, or whether such a service is supported has to be notified to the terminal.

Therefore, in the disclosure, an optimization method is provided for establishing a connection between the NEF and the AMF or the SMF and an NEF to support a data transmission service through the NEF. In particular, the effect of the disclosure is improved when configuration is performed on a group of terminals, instead of one terminal.

Also, transmitting data of the terminal to a control plane (CP) is provided as one of the CIoT services in the 5G mobile communication system. Because establishing a user plane (UP) to transmit small data sent by the terminal may be inefficient in signaling or the use of wireless resources, it is advantageous to have small data for IoT included in a signaling message sent to a CP and to transmit the signaling message including the small data for IoT. However, because numerous terminals send small data in an IoT scenario, each NF may repeatedly perform signaling as many times as the number of terminals in order to transmit one piece of data of each terminal. Accordingly, signaling may be reduced when each NF collects data received from a plurality of terminals for a predetermined period and then transmits the collected data to another NF at one time.

A terminal (e.g., a user equipment (UE)) is connected to a RAN and connects to a device that performs a mobility management function of a 5G core network device. The disclosure assumes that an AMF performs the mobile management function. The AMF may refer to a function or a device responsible for an access function of the RAN and a mobility management function of the terminal.

An SMF is an NF that performs session management. The AMF is connected to the SMF, and routes a session-related message of the terminal to the SMF. The SMF is connected to a UPF, allocates UP resources to be provided to the terminal, and establishes a terminal for transmitting data between a base station and the UPF.

An NRF stores information about NFs installed in a mobile communication operator network and notifies the information about the NFs. The NRF may be connected to all NFs, and when each NF starts running in the mobile communication operator network, the NF may be registered with the NRF and the NRF may notify that the NF is running in the mobile communication operator network.

An NEF exposes functions and services in the mobile communication operator network to the outside. Accordingly, the NEF is connected to an external AS, and delivers information or an event occurring in the NF in the mobile communication operator network to the AS or delivers information or an event requested by the AS to the NF.

A UDR acts like a home subscriber server (HSS) of a 4G network. More specifically, the UDR stores subscription information of the terminal or context used by the terminal in the mobile communication operator network.

Data service through NEF and a data transmission function through CP signaling, as described below, are two examples of functions supporting CIoT services.

Data Service Through NEF

In a 5G mobile communication network, small data sent by a terminal may be delivered to an AS through an NEF. The terminal may include the small data to be in a NAS message and transmit the NAS message including the small data to an AMF or an SMF. Thereafter, the AMF or the SMF delivers the NAS message including the small data to the NEF. The NEF delivers the NAS message including the small data to the AS. When the AS sends information, the AS sends small data for the terminal to the NEF, the NEF sends the small data to the AMF or the SMF, and the AMF or the SMF includes the small data in a NAS message and delivers the NAS message including the small data to the terminal. For example, a data path may be UE-AMF-SMF-NEF-AS or UE-AMF-NEF-AS. Such a data transmission service to a specific terminal and a specific AS through an NEF in order to transmit small data used for an IoT service may be referred to as a "data service through the NEF".

Data service through the NEF may be mainly used to transmit non-IP data sent by a terminal to an AS through an NEF (i.e., a protocol for transmission in a format other than an IP format, which may be used to reduce the size of an excessive IP header compared to actual data, and may refer to a protocol for simple data transmission such as a sensor network), which may be referred to as NIDD.

In the NIDD, because the terminal transmits data to the AS through the NEF, a protocol between the terminal and the NEF may be used. The protocol supports reliable data transmission between the terminal and the NEF, and thus, may be referred to as an RDS. That is, transmitting data through the NEF may be referred to as NIDD or RDS in the 3GPP standard, or may be referred to by another name. However, any function of transmitting data through the NEF may correspond to a service of transmitting data through the NEF, as used in the disclosure.

Data Transmission Function Through CP Signaling

Because an IoT terminal transmits/receives small data, establishing a UP connection to transmit/receive the small data is inefficient in using wireless resources and is also inefficient because signaling for establishing the UP connection occurs. Accordingly, small data transmitted by a terminal for a CIoT service may be transmitted by using CP signaling. In this case, the terminal may include data, which is to be sent by the terminal itself, in a mobility management (MM)-NAS message sent to an AMF or a session management (SM)-NAS message sent to an SMF and may transmit the data therein. The AMF or the SMF receiving the data from the terminal delivers the data to a target NF. Likewise, when external data is received, a UPF notifies the AMF or the SMF that the data has arrived at the terminal, and delivers the data to the AMF or the SMF. The AMF or the SMF receiving the data includes the data in an MM-NAS or SM-NAS message sent to the terminal and delivers the data to the terminal.

FIG. 1 is a signal flow diagram illustrating a procedure in which an NEF requests data transmission configuration, according to an embodiment. More specifically, FIG. 1 illustrates a procedure in which an NEF receives information of registered NFs from an NRF and then requests data transmission configuration through the NEF at one time. Thereafter, an NF responds to the request.

Referring to FIG. 1 in step 101, an NEF and an AS perform an NIDD configuration procedure for using a data transmission service through the NEF. The AS and the NEF perform the NIDD configuration procedure so that the data transmission service through the NEF is to be used by a specific terminal or a group of specific terminals. A terminal may be represented by an external identifier (ID) that identifies a terminal in the AS. An internal ID (e.g., a subscription concealed identifier (SUCI), a subscription permanent identifier (SUPI), or an international mobile subscriber identity (IMSI)) for identifying a terminal in a 5G system may also be identified using the external ID.

A terminal may be identified by using the external ID or the internal ID.

A group of terminals may be represented by an external group ID that identifies a group of terminals in the AS. An internal group ID for identifying a group of terminals in the 5G system or an internal ID of each of the terminals included in the group may also be identified by the external group ID.

A group of terminals may be identified using the external group ID or the internal group ID.

The NEF and the AS may set data transmission characteristics of the terminal or the group of terminals, e.g., maximum latency, the number of transmitted messages, an estimated transmission time, and a data transmission cycle of the terminal, in step 101.

In step 102, the NEF performs an event subscription procedure on an NRF to determine NFs that support the data transmission service through the NEF. For example, the NEF may transmit, by using an application programming interface (API) such as Nnrf_NFStatusSubscribe, a request to the NRF to notify when NFs that support the data transmission service through the NEF are already registered or are newly registered with the NRF. When the NEF uses Nnrf_NFStatusSubscribe, the NEF may include an indicator of capability for the data transmission service through the NEF in the request and may transmit the request to the NRF, which may be referred to as NIDD capability.

The NRF receiving the NIDD capability checks whether there are NFs capable of supporting the data transmission service through the NEF from among NFs registered with a network, and when there are NFs, transmits the NFs that support the data transmission service through the NEF and a capability identifier of the data transmission service through the NEF to the NEF through in step 104.

In steps 103a and 103b, an AMF or an SMF driven in the network performs a registration procedure on the NRF. For example, the AMF or the SMF may notify the NRF about its capability for the data transmission service through the NEF.

In response to step 104, the NRF may determine that there are NFs satisfying a condition according to subscription requested by the NEF in step 102, which are newly registered or are already registered. For example, the NRF determines NFs having capability for the data transmission service through the NEF, and then notifies the NEF of IDs of the determined NFs and the capability for the data transmission service through the NEF. In addition, the NRF may notify the NEF about service information related to the data transmission service provided by the NFs.

In steps 105a and 105b, the NEF checks information of the NFs and a service provided by the NFs delivered by the NRF, and then delivers a message for configuring the data transmission service through the NEF to the NFs capable of supporting the data transmission service through the NEF. For example, an ID of a terminal, i.e., an external ID, or an ID of a group of terminals, i.e., an external group ID, may be included in the message. Also, information for use in providing the data transmission service through the NEF to the terminal may be included. The information may include an ID of the NEF and a reference ID for identifying a connection for using the data transmission service through the NEF with the NEF. Also, configuration information for the data transmission service through the NEF may be included.

The information may include information about maximum latency for the terminal or the group to transmit data, a cycle in which the terminal or the group transmits data, and/or an estimated data transmission time. When a terminal that is to use the data transmission service through the NEF is served by the AMF or the SMF, the message of steps 105a and 105b may act as an event subscription message for requesting the AMF or the SMF to send a report to the NEF. That is, when the AMF or the SMF that stores information included in the message for configuring the data transmission service through the NEF received from the NEF begins to serve the terminal or the group of terminals indicated by the message, the AMF or the SMF may notify the NEF that the data transmission service through the NEF may be used.

In step 106, when NAS signaling is performed on the AMF or the SMF, the terminal may include an identifier indicating its use of the data transmission service through the NEF, and the AMF or the SMF may know based on the identifier that the terminal desires to use the data transmission service through the NEF. The AMF or the SMF may check subscription data of the terminal and an external ID or an external group ID used by the terminal. Accordingly, the AMF or the SMF may determine that the terminal served by the AMF or the SMF is the terminal or belongs to the terminal group included in the message for configuring the data transmission service through the NEF received through steps 105a and 105b. The AMF or the SMF may determine that the data transmission service through the NEF is to be provided to the terminal.

The SMF or the AMF determining that the data transmission service through the NEF is to be provided to the terminal in step 106 transmits a message to the NEF in step 107a or 107b. The message may include an external ID of the terminal, an external group ID to which the terminal belongs, a reference ID for identifying a connection with the NEF for using the data transmission service through the NEF received in step 105a or 105b, an ID of the NEF received in step 105a or 105b, and an NF ID indicating the SMF or the AMF.

When data is transmitted by the terminal through the data transmission service through the NEF, the data may also be included in the message of step 107a or 107b. The NEF receiving the message may determine that a connection for using the 'data transmission service through the NEF with the NF that sends the message of step 107a or 107b is established, and may identify the connection by using a combination of the reference ID and the NF ID.

The NEF receiving the data sent from the terminal in step 107a or 107b may determine the AS that configures the data transmission service through the NEF by using the data and the ID of the terminal or a target ID, and then may transmit the data to the AS.

Figure 2:
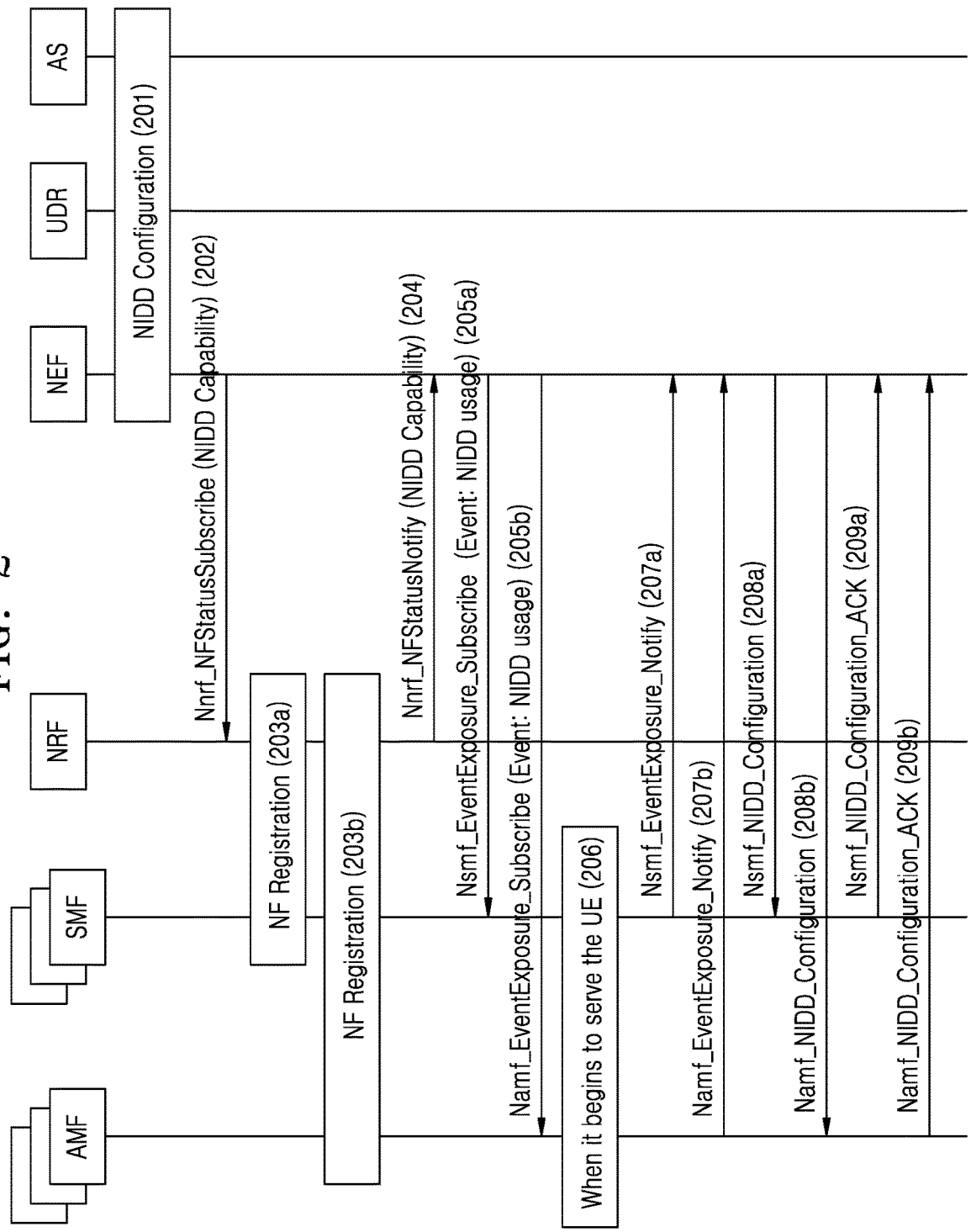
FIG. 2 is a signal flow diagram illustrating a procedure in which an NEF requests an event corresponding to the existence of a terminal using data transmission through the NEF, according to an embodiment.

FIG. 2 is a signal flow diagram illustrating a procedure in which an NEF requests an event corresponding to the existence of a terminal using data transmission through the NEF, according to an embodiment. More specifically, FIG. 2 is a diagram illustrating a procedure in which an NEF receives information of registered NFs from an NRF and then requests an event corresponding to the existence of a terminal using data transmission through the NEF at one time. When an NF responds to the request, data transmission configuration through the NEF is performed.

Referring to FIG. 2, steps 201 through 204 are the same as steps 101 through 104 of FIG. 1. Accordingly, a repeated explanation of these steps will not be given.

In steps 205a and 205b, the NEF may check information of NFs received from the NRF and a service provided by the NFs received from the NRF, and then may perform an event subscription procedure on NFs capable of supporting a data transmission service through the NEF. When there exists a terminal that is to use the data transmission service through the NEF, a terminal identified using an external ID, or a terminal identified as a terminal belonging to an external group ID, the event is to send an event report to the NEF.

In step 206, when the NF, the AMF, or the SMF, determines that a terminal served by the NF is to use the data transmission service through the NEF and the NF is to provide the data transmission service through the NEF to the terminal, and the terminal is identified by using an external ID or is identified as a terminal belonging to an external group ID, the NF performs step 207a or 207b.

In step 207a and 207b, the NF transmits an event report to the NEF. The event report may include the external ID of the terminal, the external group ID to which the terminal belongs, and/or an ID of the event set by the NEF in step 205a or 205b. The NEF receiving the event report may identify which terminal is served by which NF and is to use the data transmission service through the NEF.

In step 208a or 208b, the NEF transmits a connection setup message for the data transmission service through the NEF to the AMF or the SMF. The message may include the external ID for identifying the terminal, the external group ID to which the terminal belongs, a reference ID for identifying a connection for using the data transmission service through the NEF, and/or an NEF ID.

In step 209a or 209b, the AMF or the SMF receiving the message transmits a response, which may include the external ID for identifying the terminal, the external group ID to which the terminal belongs, the reference ID for identifying the connection for using the data transmission service through the NEF, and/or an NF ID for identifying the AMF or the SMF.

According to steps 208a through 209b, the NEF may deliver a configuration value for the data transmission service through the NEF. The configuration value may include maximum latency of the data transmission service used by the terminal, the number of transmitted messages, an estimated transmission time, and/or a data transmission cycle of the terminal.

A terminal may also transmit IoT data through NAS signaling to provide a CIoT data transmission service.

In one method, the terminal sends data through NAS signaling to an AMF, and the AMF delivers the data to a UPF or an NEF. According to this method, the terminal includes the data in an MM-NAS, which is a NAS message, and delivers the NAS message including the data to the AMF.

In a second method, the terminal includes the data in an SM-NAS message, which is a NAS message, and transmits the NAS message including the data through the AMF to the SMF, and the SMF delivers the NAS message including the data to the UPF or the NEF. According to the second method, the AMF delivers the SM-NAS message sent by the terminal to the SMF.

The disclosure includes the two methods, and a method by which the AMF, the SMF, or the NEF aggregates messages sent by a plurality of terminals and transmits the aggregated message. In the disclosure, message transmission using the two methods may be referred to as data over NAS.

Figure 3:
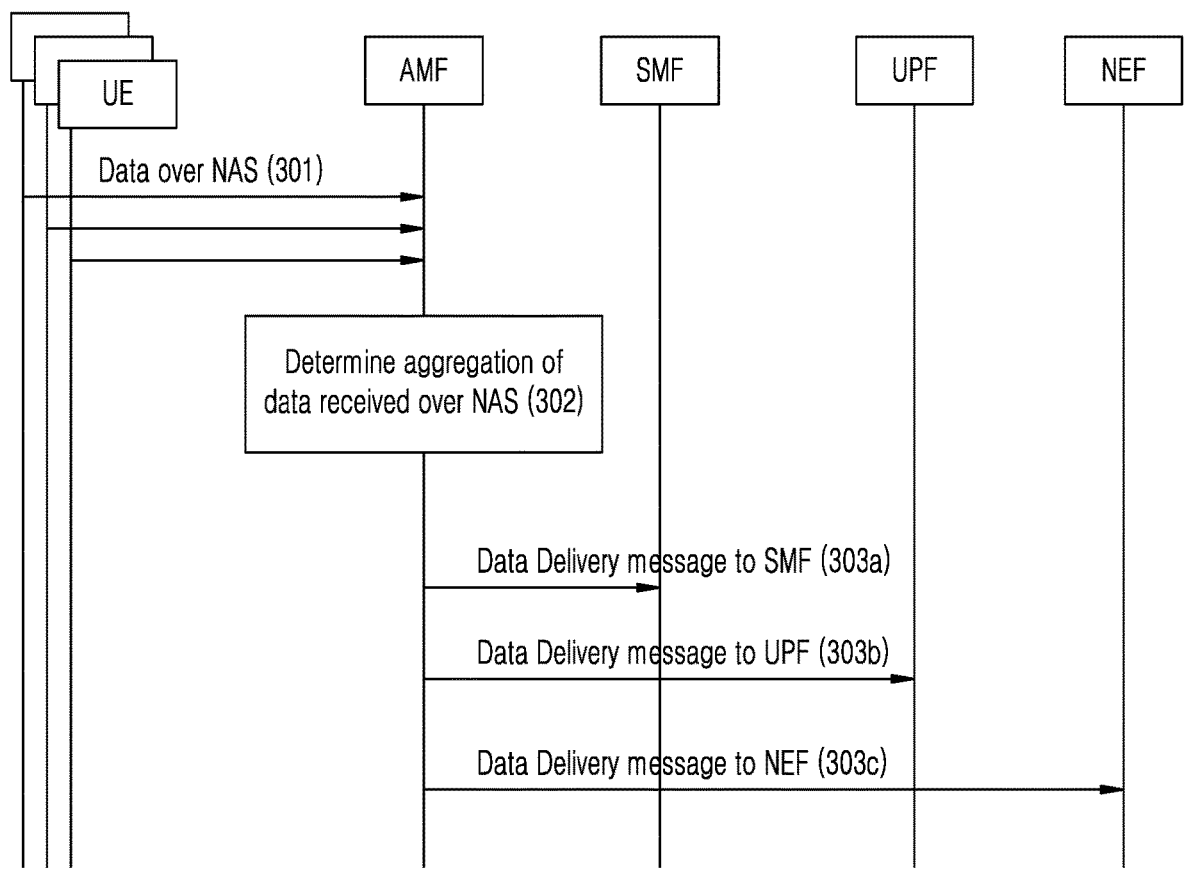
FIG. 3 is a signal flow diagram illustrating a procedure in which an access and mobility management function (AMF) delivers data to a target NF, according to an embodiment.

FIG. 3 is a signal flow diagram illustrating a procedure in which an access and mobility management function (AMF) delivers data to a target NF, according to an embodiment. More specifically, FIG. 3 illustrates a procedure in which an AMF collects data received from a plurality of terminals through NAS and delivers the data to a target NF.

Referring to FIG. 3, in step 301, a plurality of terminals provide data over NAS to the AMF.

In step 302, the AMF checks a NAS message sent by each of the plurality of terminals, and when data is included in MM-NAS signaling, determines which UPF or NEF the data is to be sent to. When a terminal uses NIDD or RDS, the AMF may determine that the data is to be sent to the NEF. Alternatively, the AMF may determine that the AMF is to directly send the data to the UPF. Alternatively, when SM-NAS is included in the NAS message sent by the terminal and the SM-NAS is determined to be an SM-NAS message for data transmission, the AMF may check a protocol data unit (PDU) session ID included in the NAS message sent by the terminals and determine which SMF the data is to be sent to.

The AMF may determine to aggregate data over NAS sent by the plurality of terminals for a predetermined period before sending the data to a target NF, and then send the aggregated data to the target NF at one time. An aggregation timer may be driven to aggregate messages.

For example, the AMF may drive the aggregation timer every time. More specifically, when a period between a time when the aggregation timer starts and a time when the aggregation timer ends is considered one interval, a first interval ends and then a second interval starts, and continuously a next interval starts in this manner. Data over NAS arriving within an interval is aggregated while the aggregation timer of the interval is driven, and then is transmitted to the target NF when the aggregation timer ends. After the aggregation timer ends, a next aggregation timer starts immediately to perform aggregation of a next interval.

As another example, when first data over NAS arrives while the aggregation timer is stopped, the AMF starts the aggregation timer, aggregates data over NAS arriving from terminals while the aggregation timer is driven, and when the aggregation timer ends, delivers the aggregated data to the target NF. The aggregation timer does not re-start, remains in an end state, and then re-starts when next data over NAS arrives.

According to an embodiment of the disclosure, a time and a method at which and by which the AMF performs aggregation are as follows.

A latency value for data over NAS set by a mobile communication network operator is set in the AMF, and the AMF determines an aggregation timer value according to the latency value.

The AMF checks a max latency value for an IoT service of terminals in subscription data of the terminals, aggregates data over NAS of terminals having the same max latency value, and determines a value less than or equal to the max latency value as an aggregation timer value. For example, the AMF aggregates data over NAS arriving from terminals in subscription data having a max latency value of 5 minutes and sets an aggregation timer value to a value less than or equal to 5 minutes, in order to prevent a delay time including a time taken for data to be delivered through another NF to a data network or an AS from exceeding 5 minutes.

When a max latency value for a data transmission service through an NEF of terminals exists in a configuration value received from the NEF, the AMF sets an aggregation timer value to a value less than or equal to a delay time for data transmission through the NEF of terminals having the same max latency value.

From among terminals that are served by the AMF, when it is indicated or determined that terminals are tolerant to data transmission delay, i.e., are delay tolerant terminals, when being connected to the AMF, the AMF may collect and aggregate data over NAS sent by the delay tolerant terminals.

When it is indicated in a NAS message that terminals send data over NAS for an exception report or the AMF receives an identifier that a radio resource control (RRC) connection of the terminals is established due to the exception report from a base station, the AMF does not perform aggregation on the data over NAS.

The AMF may check data over NAS sent by terminals and quality of service (QoS) for transmission of the data. The AMF may collect and aggregate data over NAS indicating the same QoS, and may exclude data over NAS indicating QoS with no long delay from an aggregation operation and may directly deliver the data over NAS indicating QoS with no long delay to a target NF.

The AMF that is aggregating data over NAS while an aggregation timer is driven may stop an aggregation operation before exceeding a maximum message size that the AMF may send to a target NF and may transmit the data aggregated until the AMF stops the aggregation operation to the target NF.

According to a result of step 302, when the target NF is an SMF, the AMF uses an API for delivering SM-NAS to the SMF, and includes an aggregated message in a message using the API in step 303a. That is, the AMF includes an aggregated list including the SM-NAS, a terminal ID sending the SM-NAS, and a PDU session ID used by the terminal in the message, and then delivers the message including the aggregated list (list={SM-NAS, UE ID, PDU Session ID}). Also, an aggregation timer may be included in the message, to indicate a time for which aggregation is actually performed. For example, this information may be used when aggregation is performed by the SMF or when the SMF transmits data according to a latency requirement.

According to a result of step 302, when the target NF is a UPF, the AMF may include an aggregated list including a data payload and IDs of terminals in the message and may deliver the message including the aggregated list to the UPF in step 303b. The AMF may use a general packet radio service (GPRS) tunneling protocol-UP tunnel (GTP-U tunnel) to transmit data to the UPF. The AMF and the UPF establish a GTP-U connection for data transmission, which may be performed when the terminals perform data transmission through a CP with the AMF. When the GTP-U connection is established, the AMF and the UPF may check whether packet aggregation is supported. For example, when the AMF selects the UPF for the GTP-U connection with the UPF (UPF selection), the AMF may also consider whether a packet aggregation function is supported. When the AMF sends a message for establishing the GTP-U connection to the UPF, the AMF may send capability for packet aggregation, and the UPF may send a response indicating that the UPF also supports packet aggregation. Also, when the AMF selects the UPF through the SMF, the AMF may indicate whether a packet aggregation function is supported to the SMF, and the SMF may select a UPF that supports packet aggregation and then may deliver an address of the UPF to the AMF.

The AMF and the UPF that establish the GTP-U tunnel supporting packet aggregation may perform data packet aggregation. A GTP-U tunnel header may include an IP address (e.g., a source and a destination) of each of the NFs, a user datagram protocol (UDP) header, and a GTP header (e.g., a tunneling endpoint ID) for identifying a session. When packet aggregation is applied and the AMF aggregates uplink data sent by the terminals, the GTP-U tunnel header may include an IP address of the AMF as a source IP, an IP address of the UPF as a target IP, a UDP header, and an uplink GTP header (i.e., an uplink tunnel end point ID (TEID) of a connection for the packet aggregation) for identifying the connection to which the packet aggregation is applied. The AMF may add uplink TEIDs of sessions of terminals to the front of packets received from the terminals, in order to allow the UPF to identify which sessions of which terminals data packets received from the AMF are for.

The AMF may add uplink TEIDs of sessions of terminals to packets sent by the terminals and may aggregate the packets to which the uplink TEIDs are added. That is, the AMF may add uplink TEIDs of sessions of a plurality of terminals to the front of data packets arriving from the plurality of terminals, may successively connect the data packets to which the uplink TEIDs are added, and may inject the data packets to which the uplink TEIDs are added into a GTP-U payload for the GTP-U tunnel, thereby obtaining the structure illustrated in FIG. 8.

The UPF receiving a message from the AMF may know from a GTP-U header that an aggregated packet has arrived from the AMF, may determine, from the uplink TEIDs of the PDU sessions of the terminals in the GTP-U payload, which data is received from which PDU sessions of which UEs, and thus, may transmit the packet to a data network.

Likewise, regarding downlink data, the UPF may check a packet sent to a terminal, and may identify a TEID of a PDU session of the terminal.

During packet aggregation, the UPF may add a downlink TEID of the PDU session of the terminal to the front of the packet sent to the terminal, and may continuously perform aggregation by performing the same operation on other terminals. When a header of the GTP-U tunnel sent to the AMF is set, the header may include an IP address of the UPF as a source IP, an IP address of the AMF as a destination IP, and a GTP header (i.e., a TEID of a connection for packet aggregation) for identifying the connection to which the UDP header and the packet aggregation are applied. The UPF may add an aggregated list (downlink TEIDs of PDU sessions of terminals+packets for the terminals) to the header to be sent to the GTP-U tunnel and then may deliver the header to which the aggregated list is added to the AMF.

The AMF receiving the aggregated list may know from a GTP-U header that an aggregated packet has arrived from the UPF, may determine, from the downlink TEIDs of the PDU sessions of the terminals in a GTP-U payload, which data are received from which PDU sessions of which UEs, and thus, may transmit the packet to the terminals.

According to a result of step 302, when the target NF is an NEF, in step 303c, the AMF may include an aggregated list including a data payload, and IDs (external IDs) of terminals or a reference ID for identifying a connection between the AMF and the NEF for NIDD of the terminals in a message, and may deliver the message including the aggregated list to the NEF. That is, the AMF may deliver aggregated data including the list of [the IDs of the terminals or the reference ID+the data payload] to the NEF. An aggregation timer may be included in the message to indicate a time during which aggregation is performed. For example, this information may be used when aggregation is performed by the NEF or when the NEF transmits data according to a latency requirement.

Aggregation may be applied when the AMF sends data to the NEF or when the NEF sends data to the AMF. Also, the AMF and the NEF may use a hyper text transfer protocol (HTTP)-based API, and information included in the API may include the aggregated data and the aggregation timer. The AMF and the NEF may identify, from the IDs of the terminals or the reference ID, which terminals a connection is for and may transmit data for the connection.

While the AMF aggregates data over NAS arriving from a plurality of terminals, when the AMF knows that a handover of a terminal occurs in an aggregated message and a serving AMF of the terminal is changed, the AMF may stop the aggregation and transmit data to the target NF. Because the serving AMF is changed and is connected to a new SMF, UPF, or NEF, the AMF may transmit data before an existing connection is updated to a new connection.

Figure 4:
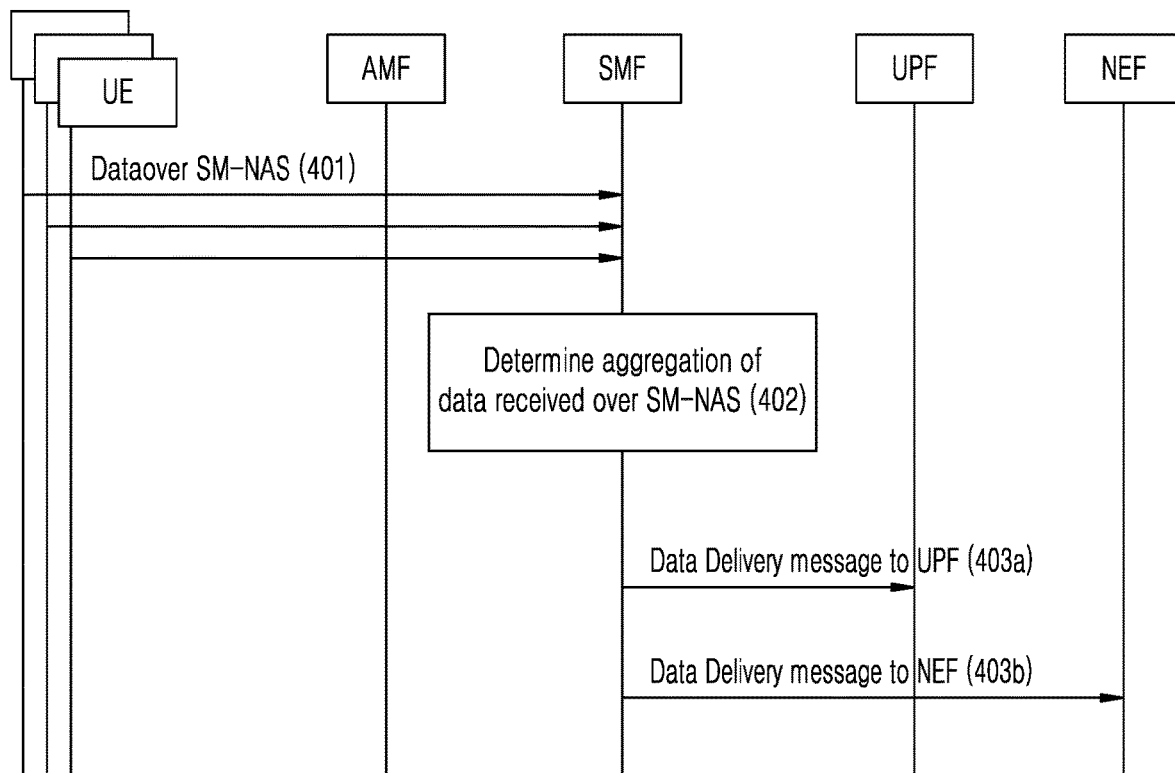
FIG. 4 is a signal flow diagram illustrating a procedure in which a session management function (SMF) delivers data to a target NF, according to an embodiment.

FIG. 4 is a signal flow diagram illustrating a procedure in which a session management function (SMF) delivers data to a target NF, according to an embodiment. More specifically, FIG. 4 illustrates a procedure in which an SMF collects data received through SM-NAS from a plurality of terminals and delivers the data to a target NF.

Referring to FIG. 4, in step 401, a plurality of terminals provide data over SM-NAS to the SMF, which performs aggregation.

In step 402, when the SMF checks SM-NAS sent by terminals and the SM-NAS is determined to be an SM-NAS message for data transmission, the SMF may determine whether to aggregate data over NAS sent by the terminals.

In steps 403a or 403b, the SMF may determine whether to transmit data received as the SM-NAS message to a UPF or an NEF. When an identifier indicating whether the SM-NAS message sent by the terminals is for a data transmission service through the NEF is included in the SM-NAS or it is notified that it is already a data transmission service through the NEF when the terminals establish sessions, the SMF may determine whether to transmit data to the UPF or the NEF.

A method by which the SMF drives an aggregation timer is the same as a method by which the AMF drives an aggregation timer, as described above with reference to FIG. 3.

A time and a method at which and by which the SMF performs aggregation are as follows.

A latency value for data over NAS set by a mobile communication network operator is set in the SMF, and the SMF determines an aggregation timer value according to the latency value.

The SMF checks a max latency value for an IoT service of terminals in subscription data of the terminals, aggregates data over NAS of terminals having the same max latency value, and determines a value less than or equal to the max latency value as an aggregation timer value. For example, the SMF aggregates data over NAS arriving from terminals in subscription data having a max latency value of 5 minutes and sets an aggregation timer value to a value less than or equal to 5 minutes, in order to prevent a delay time including a time taken for data to be delivered through another NF to a data network or an AS from exceeding 5 minutes.

When a max latency value for a data transmission service through an NEF of terminals exists in a configuration value received from the NEF, the SMF sets an aggregation timer value to a value less than or equal to a delay time for data transmission through the NEF of terminals having the same max latency value.

From among terminals that are served by the SMF, when it is indicated or determined that terminals are tolerant to data transmission delay, i.e., are delay tolerant terminals, when being connected to the SMF, the SMF may collect and aggregate data over NAS sent by the delay tolerant terminals.

When it is indicated in a NAS message that terminals send data over NAS for an exception report or the SMF receives an identifier that an RRC connection of the terminals is established due to the exception report from a base station, the SMF does not perform aggregation on the data over NAS.

The SMF may check data over NAS sent by terminals and QoS for transmission of the data. The SMF may collect and aggregate data over NAS indicating the same QoS, and may exclude data over NAS indicating QoS with no long delay from an aggregation operation and may directly deliver the data over NAS indicating QoS with no long delay to a target NF.

The SMF aggregating data over NAS while an aggregation timer is driven may stop the aggregation operation before exceeding a maximum message size that the SMF may send to a target NF and may transmit the data aggregated until the SMF stopped the aggregation operation, to the target NF.

The SMF may use a GTP-U tunnel to transmit data to the UPF. The SMF and the UPF may establish a GTP-U connection for data transmission. The SMF and the UPF may establish the GTP-U connection, which may be performed when PDU sessions for data transmission through a CP of terminals are established. The SMF and the UPF may generate the GTP-U tunnel for small data transmission regardless of the terminals, and the generated GTP-U tunnel may be shared for data transmission of a plurality of terminals.

When the GTP-U connection is established, the SMF and the UPF may check whether packet aggregation is supported. For example, when the SMF selects the UPF for the GTP-U connection with the UPF (UPF selection), the SMF may also consider whether a packet aggregation function is supported. When the SMF sends a message for establishing the GTP-U connection to the UPF, the SMF may send capability for packet aggregation, and the UPF may send a response indicating that the UPF also supports packet aggregation.

When the SMF discovers the UPF through an NRF, the SMF may indicate whether a packet aggregation function of the UPF is supported, and the NRF may find a UPF that supports packet aggregation and then deliver an address of the UPF to the SMF. The SMF and the UPF that establish the GTP-U tunnel supporting packet aggregation may perform data packet aggregation.

A GTP-U tunnel header may include an IP address (e.g., a source and a destination) of each of NFs, a UDP header, and a GTP header (e.g., a tunneling endpoint ID) for identifying a session. When packet aggregation is applied and the SMF aggregates uplink data sent by terminals, the GTP-U tunnel header may include an IP address of the SMF as a source IP, an IP address of the UPF as a target IP, a UDP header, and an uplink GTP header (i.e., an uplink TEID of a connection for packet aggregation) for identifying the connection to which the packet aggregation is applied. The SMF may add uplink TEIDs of sessions of terminals to the front of packets received from the terminals, in order to allow the UPF to identify which sessions of which terminals data packets received from the SMF are for.

The SMF may add uplink TEIDs of sessions of terminals to packets sent by the terminals and may aggregate the packets to which the uplink TEIDs are added. That is, the SMF may add uplink TEIDs of sessions of a plurality of terminals to the front of data packets arriving from the plurality of terminals, may successively connect the data packets to which the uplink TEIDs are added, and may inject the data packets to which the uplink TEIDs are added into a GTP-U payload for the GTP-U tunnel, thereby obtaining the structure illustrated in FIG. 9.

The UPF receiving a message from the SMF may know from a GTP-U header that an aggregated packet has arrived from the SMF, may determine, from the uplink TEIDs of the PDU sessions of the terminals in the GTP-U payload, which data is received from which PDU sessions of which UEs, and thus, may transmit the packet to a data network.

Likewise, regarding downlink data, the UPF may check a packet sent to a terminal, and may identify a TEID of a PDU session of the terminal.

Figure 10:
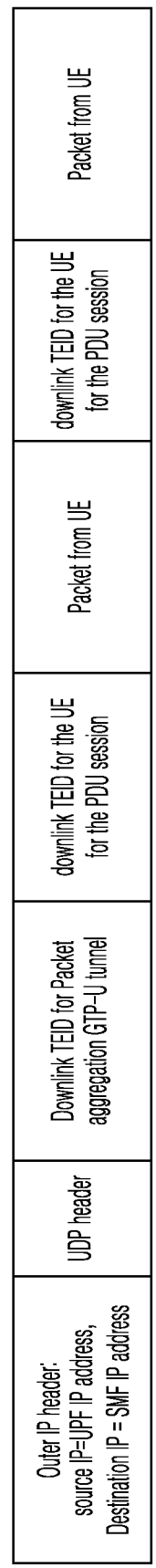
FIG. 10 illustrates a structure of a message from a user plane function (UPF) according to an embodiment.

During packet aggregation, the UPF may add a downlink TEID of the PDU session of the terminal to the front of the packet sent to the terminal, and may continuously perform aggregation by performing the same operation on other terminals. When a header of the GTP-U tunnel sent to the SMF is set, the header may include an IP address of the UPF as a source IP, an IP address of the SMF as a destination IP, and a GTP header (i.e., a downlink TEID of a connection for packet aggregation) for identifying the connection to which the UDP header and the packet aggregation are applied. The UPF may add an aggregated list (downlink TEIDs of PDU sessions of terminals+packets for the terminal) to the header to be sent to the GTP-U tunnel and then may deliver the header to which the aggregated list is added to the SMF, thereby obtaining the structure illustrated in FIG. 10.

The SMF receiving a message from the UPF may know from A GTP-U header that an aggregated packet has arrived from the UPF, may determine, from the downlink TEIDs of the PDU sessions of the terminals in the GTP-U payload, which data is received from which PDU sessions of which UEs, and thus, may transmit the packet to the terminals.

Figure 5:
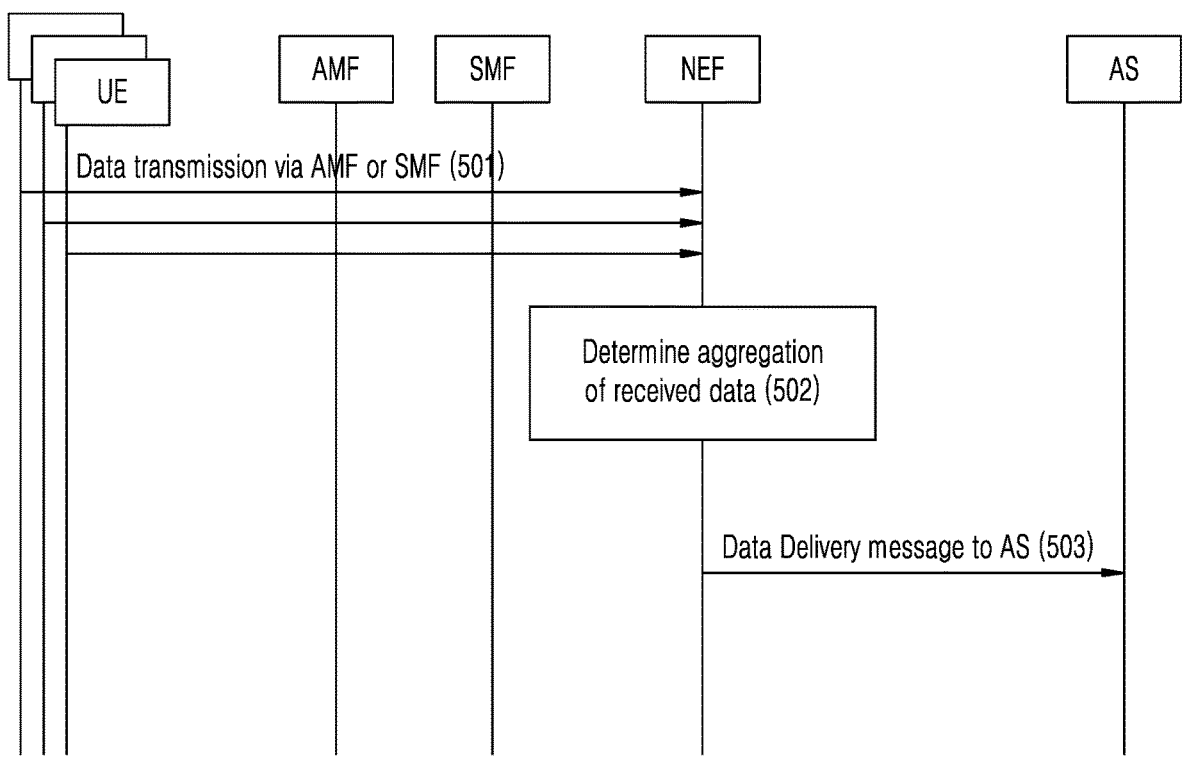
FIG. 5 is a signal flow diagram illustrating a procedure in which an NEF delivers data to an AS, according to an embodiment.

FIG. 5 is a signal flow diagram illustrating a procedure in which an NEF delivers data to an AS, according to an embodiment. More specifically, FIG. 5 illustrates a procedure in which an NEF receives data sent by a plurality of terminals from an NF, collects the data, and delivers the data to an AS.

Referring to FIG. 5, in step 501, a plurality of terminals provide data an AMF or an SMF to an NEF.

In step 502, the NEF determines whether to aggregate the received data sent by the terminals.

The NEF of FIG. 5 may drive an aggregation timer using the same method as the AMF in FIG. 3, as described above.

The NEF performs aggregation on data having the same target AS from among data.

The NEF performs aggregation on data for the same external group ID from among received data. That is, the NEF may deliver aggregated data including a list of [group IDs of terminals or a reference ID+a data payload] to the AS.

When the AMF or an SMF delivers an aggregated time, the NEF may consider the aggregated time and may perform aggregation according to a max latency required by the target AS.

When the AMF or the SMF does not deliver the aggregated time, the NEF may determine that aggregation has not occurred, and may perform aggregation according to a max latency required by the target AS.

When the NEF delivers aggregated data to the AS, the NEF forms a list including data and external IDs or external group IDs of UEs as a pair and delivers the list.

When an NF (e.g., the AMF or the SMF) and the NEF establish a connection to support a data transmission service through the NEF in a 5G system, the NF and the NEF may establish the connection without depending on a registration procedure of grouped terminals or a subscription update procedure of a UDR, thereby making it possible to provide the data transmission service through the NEF suing less signaling and fewer procedures. Because the data transmission service through the NEF is set to all related NFs in a network, an individual procedure does not need to be performed on each NF when the grouped terminals are set.

Further, when small data sent by a terminal is delivered to a CP, the 5G system may aggregate data sent by a plurality of terminals, and include the aggregated data in a message, which is sent to each NF. Accordingly, small data sent by a lot of terminals may be delivered through smaller signaling.

When a terminal transmits small data that is intermittently generated, the small data may be transmitted in a single packet that does not require a response, a packet that requires a response, or multiple packets. A base station may distinguish the three cases, and more efficient use of wireless resources and scheduling may be achieved.

Figure 6:
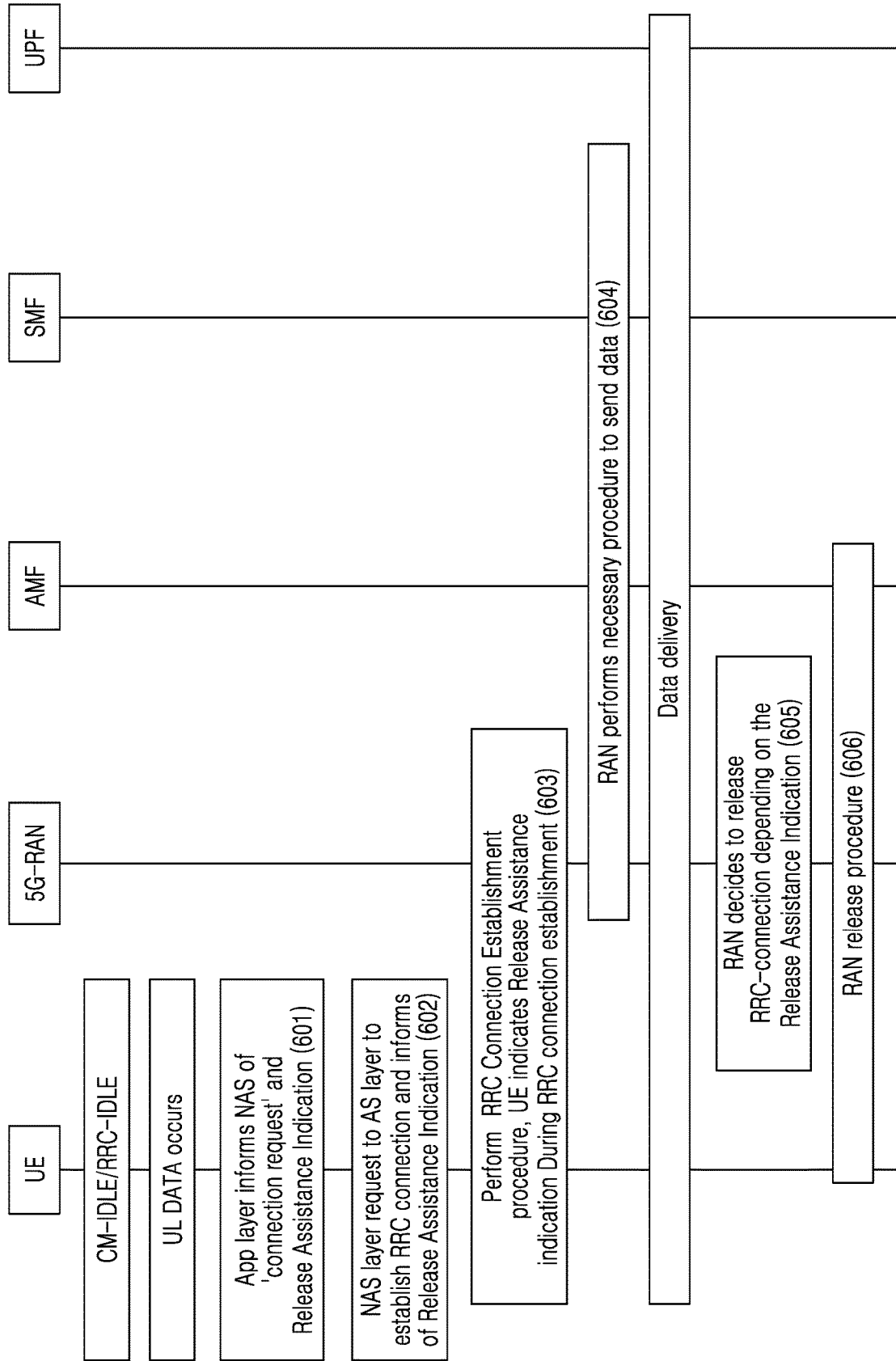
FIG. 6 is a diagram illustrating a RAN release procedure, according to an embodiment.

FIG. 6 is a diagram illustrating a RAN release procedure, according to an embodiment. More specifically, FIG. 6 illustrates a method by which a terminal notifies release assistance information to a base station and a procedure in which the base station uses the release assistance information.

The term "release assistance information (RAI)" used herein refers to information that a terminal sets according to characteristics of a data packet sent by the terminal. Data sent by an IoT terminal may be transmitted in a packet that does not require a response message, such as sending data that is periodically sent, i.e., a packet that ends after being sent in an uplink direction one time, which may be referred to as a single packet. When a response to a message sent by the IoT terminal is required, because there are one downlink transmission and one uplink transmission, such packets may be referred to as dual packets.

The IoT terminal may use several message exchanges. In this case, because a plurality of uplink transmissions and downlink transmissions occur, such packets may be referred to as multiple packets. A terminal may notify a base station about such a single packet, dual packets, or multiple packets when requesting wireless resources. Such information may be referred to as RAI.

RAI may be divided into a single packet, dual packets, and multiple packets, or may exist in another form. For example, RAI may be an identifier bit indicating the following information.

One time transmission without a response. One uplink transmission occurs.
Transmission requiring a response. One uplink transmission and one downlink transmission occur.
Multiple transmissions required. Multiple uplink transmissions and multiple downlink transmissions occur.

Any information referring to or indicating the above three cases may be information corresponding to RAI of the disclosure.

A terminal may deliver RAI to a base station, when requesting an RRC connection, and the base station may manage the RRC connection of the terminal according to the RAI.

Referring to FIG. 6, a terminal is initially in a CM-IDLE or RRC-IDLE state.

When there is data to be sent to a server (UL data occurs), an application layer of the terminal requests a NAS layer for a connection in step 601. For example, the application layer may also notify the NAS layer about characteristics of a packet, i.e., RAI. The RAI may include information about the following three cases.

1. When the data to be sent by the application layer is data indicating a sensing result, it is notified that the data corresponds to a single packet and ends after being transmitted in an uplink direction one time without having to wait for a response.
2. When the data to be sent by the application layer is important data and requires a response or data requiring a response, because a response is required, it is notified that at least one time downlink transmission is to occur.
3. When the data to be sent by the application layer uses a procedure in which a message is transmitted/received several times, it is notified that multiple data transmissions in uplink and downlink directions are to occur. When a value indicated by the RAI is not 1 and 2, it may be recognized that the value corresponds to the case 3.

In step 602, the NAS layer requests an AS layer for an RRC connection to establish an RRC connection of the terminal, and the RAI received in step 601 is included.

In step 603, the terminal performs an RRC connection establishment procedure with a base station, and the AS layer of the terminal delivers the RAI to the base station during the RRC connection establishment procedure, in order to notify about characteristics of a connection to be established by the terminal.

In step 604, the base station performs a procedure for a UP connection for data transmission of the terminal with a core network. Thereafter, data sent by the terminal is delivered through the base station to a UPF and is delivered to a data network.

In step 605, the base station may perform the following operation according to the RAI provided in step 603.

1. When one time transmission without a response is required, and thus, one uplink transmission occurs,
  the base station may set a time for determining RRC inactivity of the terminal to a short time, for the RAI corresponding to the case 1. Accordingly, when the terminal does not use wireless resources for a while after sending the data, the base station waits for a short period of time, and may determine inactivity and may release the wireless resources. Because an IoT terminal is sensitive to power consumption, fast release of the wireless resources may help to reduce battery consumption.

2. When a transmission requires a response, and thus, one uplink transmission and one time downlink transmission occur,
  the base station may determine that a time for determining RRC inactivity of the terminal is a time when downlink data for the terminal arrives, for the RAI corresponding to the case 2. That is, until the downlink data arrives at the terminal, the base station may maintain wireless resources of the terminal, without releasing the wireless resources. When the downlink data occurs in the terminal or when a timer for determining inactivity ends, the wireless resource of the terminal may be released.

3. When multiple transmissions are required, and thus, multiple uplink transmissions and multiple downlink transmissions occur,
  for the RAI corresponding to the case 3 or for a terminal not including information about the case 1 and 2, the base station may set and manage a value that is the same as that of another general terminal (other than an IoT terminal) that determines RRC inactivity. Alternatively, based on low data throughput and signaling processing speed of the IoT terminal, the base station may set a time for determining RRC inactivity when the IoT terminal corresponds to the case 3 to a time longer than that of a general terminal.

In step 606, the base station performs connection release by releasing wireless resources and notifying about the releasing to an AMF.

In accordance with an embodiment of the disclosure, when a terminal sends a request to a base station for resources to transmit small data that is intermittently generated and establishes a UP connection for data transmission, the terminal may provide information about whether the data transmission is single packet transmission, packet transmission requiring a response, or multiple packet transmissions. Assuming that a connection established by the terminal is single packet transmission that does not require a response, when inactivity of an RRC connection of the terminal occurs, the base station may directly release the connection and may secure wireless resources. When the connection established by the terminal is multiple packet transmissions, the base station may determine that the RRC connection of the terminal is to be maintained for a longer time, in order not to unnecessarily release the connection of the terminal and not to attempt to establish a connection again. As a result, the amount of battery used for the IoT terminal to maintain the wireless resources may be reduced.

Figure 7:
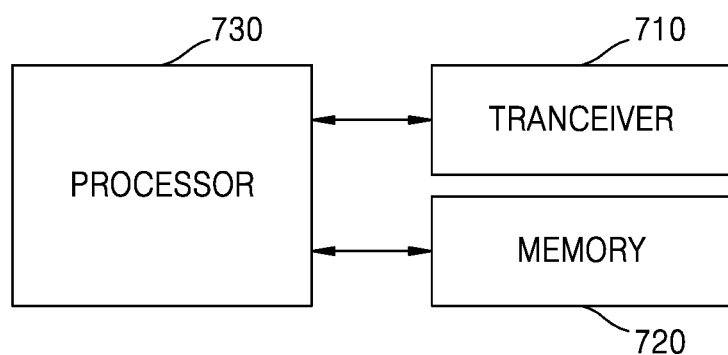
FIG. 7 illustrates an entity according to an embodiment.

FIG. 7 illustrates an entity according to an embodiment.

Referring to FIG. 7, the entity includes a transceiver 710, a memory 720, and a processor 730. The transceiver 710, the memory 720, and the processor 730 of the entity may operate according to an operation method of the entity. A structure of the entity of FIG. 7 may be applied to the above entities, e.g., a UE, an AMF, an SMF, a UPF, an NEF, etc. However, elements of the entity are not limited thereto. For example, the entity may include more or fewer elements than those illustrated in FIG. 7.

Also, the transceiver 710, the memory 720, and the processor 730 may be implemented as one chip.

The transceiver 710 may transmit/receive a signal to/from another entity. The signal may include control information and data. The transceiver 710 may include a radio frequency (RF) transmitter that up-converts and amplifies a frequency of a transmitted signal, and an RF receiver that performs low-noise amplification on a received signal and down-converts a frequency, but the elements of the transceiver 710 are not limited to the RF transmitter and the RF receiver. For example, the transceiver 710 may be a transceiver for wired communication between entities.

The transceiver 710 may receive a signal through a wired/wireless channel, output the signal to the processor 730, and transmit a signal output from the processor 730 through the wired/wireless channel.

The memory 720 may store a program and data needed to operate the entity. The memory 720 may store control information or data included in the signal obtained by the entity. The memory 720 may include a storage medium such as a read-only memory (ROM), a random-access memory (RAM), a hard disc, a compact disc-ROM (CD-ROM), a digital versatile disk (DVD), or a combination of storage media.

The processor 730 may control a series of processes to operate the entity according to the above-described embodiments of the disclosure. For example, when the entity is an NEF, the processor 730 may control the entity to perform NIDD configuration for using a data transmission service through the NEF with an AS by using elements such as the transceiver 710 and the memory 720, receive identification information of an NF that supports the data transmission service through the NEF and information related to NIDD capability of the NF for the data transmission service through the NEF, perform NIDD configuration for using the data transmission service through the NEF with the NF based on the identification information and the information related to the NIDD capability, and transmit data through the data transmission service through the NEF to the AS.

According to the one or more embodiments of the disclosure, services may be effectively provided in mobile communication systems.

Each embodiment of the disclosure may be individually performed, a combination of embodiments of the disclosure may be performed, or a combination of at least parts of each embodiment of the disclosure may be performed.

A combination of embodiments of the disclosure may be performed. For example, a combination of some embodiments of the disclosure may be performed by a base station and a terminal. Also, although the above embodiments of the disclosure are provided based on an NR system, modifications based on the technical spirit of the embodiments of the disclosure may be made in other systems such as a frequency division duplex (FDD) system or a time division duplex (TDD) LTE system.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a wireless communication system, the method comprising:

identifying, by an access stratum (AS) layer of the terminal, release assistance information (RAI);

transmitting, to a base station, a control message associated with a radio resource control (RRC) connection, the control message including the RAI identified by the AS layer of the terminal; and transmitting uplink data to the base station, wherein the RAI indicates that no further data transmission is required or a single downlink data transmission subsequent to the uplink data is required, and wherein the uplink data is transmitted to a user plane function (UPF) entity via the base station.

2. The method of claim 1, wherein the RRC connection with the base station is released in case that the RAI indicates that the no further data transmission is required.

3. The method of claim 1, further comprising:

receiving, from the base station, downlink data subsequent to the uplink data in case that the RAI indicates that the single downlink data transmission subsequent to the uplink data is required, wherein the RRC connection with the base station is released in accordance with a transmission of the downlink data.

4. The method of claim 1, wherein the terminal is in a connection management (CM) idle state.

5. A method performed by a base station in a wireless communication system, the method comprising:

receiving, from a terminal, a control message associated with a radio resource control (RRC) connection, the control message including release assistance information (RAI) identified by an access stratum (AS) layer of the terminal;

receiving uplink data from the terminal; and transmitting the uplink data to a user plane function (UPF) entity, wherein the RAI indicates that no further data transmission is required or a single downlink data transmission subsequent to the uplink data is required.

6. The method of claim 5, wherein the RRC connection with the terminal is released in case that the RAI indicates that the no further data transmission is required.

7. The method of claim 5, further comprising:

transmitting, to the terminal, downlink data subsequent to the uplink data in case that the RAI indicates that the single downlink data transmission subsequent to the uplink data is required, wherein the RRC connection with the terminal is released in accordance with a transmission of the downlink data.

8. The method of claim 5, wherein the terminal is in a connection management (CM) idle state.

9. A terminal in a wireless communication system, the terminal comprising:
a transceiver; and
at least one controller configured to:
identify, by an access stratum (AS) layer of the terminal, release assistance information (RAI),
transmit, to a base station via the transceiver, a control message associated with a radio resource control (RRC) connection, the control message including the RAI identified by the AS layer of the terminal, and
transmit uplink data to the base station via the transceiver,
wherein the RAI indicates that no further data transmission is required or a single downlink data transmission subsequent to the uplink data is required, and
wherein the uplink data is transmitted to a user plane function (UPF) entity via the base station.

10. The terminal of claim 9,
wherein the RRC connection with the base station is released in case that the RAI indicates that the no further data transmission is required.

11. The terminal of claim 9, wherein the at least one controller is further configured to:
receive, from the base station via the transceiver, downlink data subsequent to the uplink data in case that the RAI indicates that the single downlink data transmission subsequent to the uplink data is required,
wherein the RRC connection with the base station is released in accordance with a transmission of the downlink data.

12. The terminal of claim 9, wherein the terminal is in a connection management (CM) idle state.

13. A base station in a wireless communication system, the base station comprising:
a transceiver; and
at least one controller configured to:
receive, from a terminal via the transceiver, a control message associated with a radio resource control (RRC) connection, the control message including release assistance information (RAI) identified by an access stratum (AS) layer of the terminal,
receive uplink data from the terminal via the transceiver, and
transmit the uplink data to a user plane function (UPF) entity via the transceiver,
wherein the RAI indicates that no further data transmission is required or a single downlink data transmission subsequent to the uplink data is required.

14. The base station of claim 13,
wherein the RRC connection with the base station is released in case that the RAI indicates that the no further data transmission is required.

15. The base station of claim 13, wherein the at least one controller is further configured to:
transmit, to the terminal via the transceiver, downlink data subsequent to the uplink data in case that the RAI indicates that the single downlink data transmission subsequent to the uplink data is required,
wherein the RRC connection with the base station is released in accordance with a transmission of the downlink data.

16. The base station of claim 13, wherein the terminal is in a connection management (CM) idle state.

* * * * *